Figure 2:
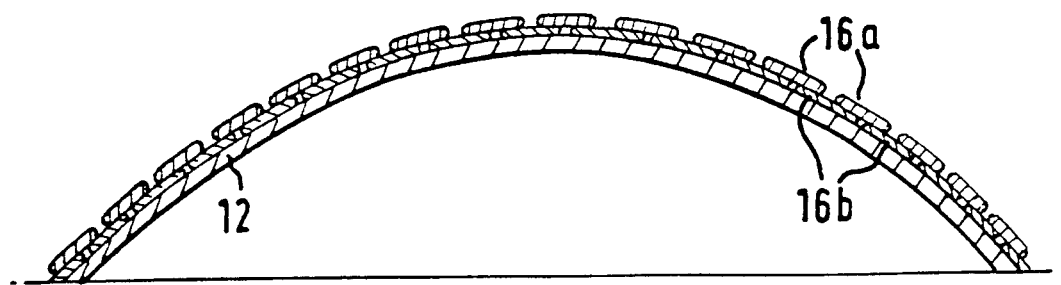

United States Patent [19]

Williams et al.

[11] Patent Number: 5,071,092
[45] Date of Patent: Dec. 10, 1991

[54] FAIRING ARRANGEMENTS FOR AIRCRAFT

[75] Inventors: George H. Williams, Bristol; Graham Young, Farmborough; Ian D. Parrott, Coleford, all of United Kingdom

[73] Assignee: British Aerospace PLC, London, United Kingdom

[21] Appl. No.: 609,613

[22] Filed: Nov. 6, 1990

[30] Foreign Application Priority Data

Nov. 6, 1989 [GB] United Kingdom ............... 8924981

[51] Int. Cl.$^5$ ............................................. B64C 1/00
[52] U.S. Cl. ................................. 244/129.1; 244/130
[58] Field of Search .............. 244/130, 131, 132, 133, 244/129.1, 129.4; 49/156, 191, 310, 392, 393, 475, 479, 486, 496

[56] References Cited

U.S. PATENT DOCUMENTS

| | | | |
|---|---|---|---|
| 2,461,745 | 2/1949 | Lang | 244/130 |
| 2,776,100 | 1/1957 | Breguet | 244/133 X |
| 4,427,169 | 1/1984 | Brown | 244/130 X |
| 4,720,061 | 1/1988 | Abdenour et al. | 244/130 X |
| 4,838,502 | 6/1989 | Pinson | 244/130 X |

FOREIGN PATENT DOCUMENTS

| | | | |
|---|---|---|---|
| 0303102 | 2/1989 | European Pat. Off. | 244/129.4 |
| 2216710 | 10/1973 | Fed. Rep. of Germany | |
| 987792 | 8/1965 | United Kingdom | |

*Primary Examiner*—Galen Barefoot
*Assistant Examiner*—Carla Mattix
*Attorney, Agent, or Firm*—Kerkam, Stowell, Kondracki & Clarke

[57] ABSTRACT

An externally mounted aircraft fairing arrangement for mounting on an aircraft wing that has a hingedly displaceable control surface, such as an aileron, includes a first fairing portion (11) on the wing aircraft structure and a second fairing portion (12) located on the control surface, bridged over by an intermediate flexible seal arrangement. The flexible seal arrangement (13) comprises a plurality of slidably overlapping layers (16) of longitudinally extending fingers (16a, 16b) on the fixed fairing portion (e.g. 11) and overlapping and slidably engaging the other fixed fairing portion (e.g. 12). The fingers (16a, 16b) of the layers lie in laterally staggered relationship with respect to each other such that in operation they can accommodate differential movement between the fairing portions (11, 12) when the control surface is angularly disposed relative to the fixed structure.

8 Claims, 2 Drawing Sheets

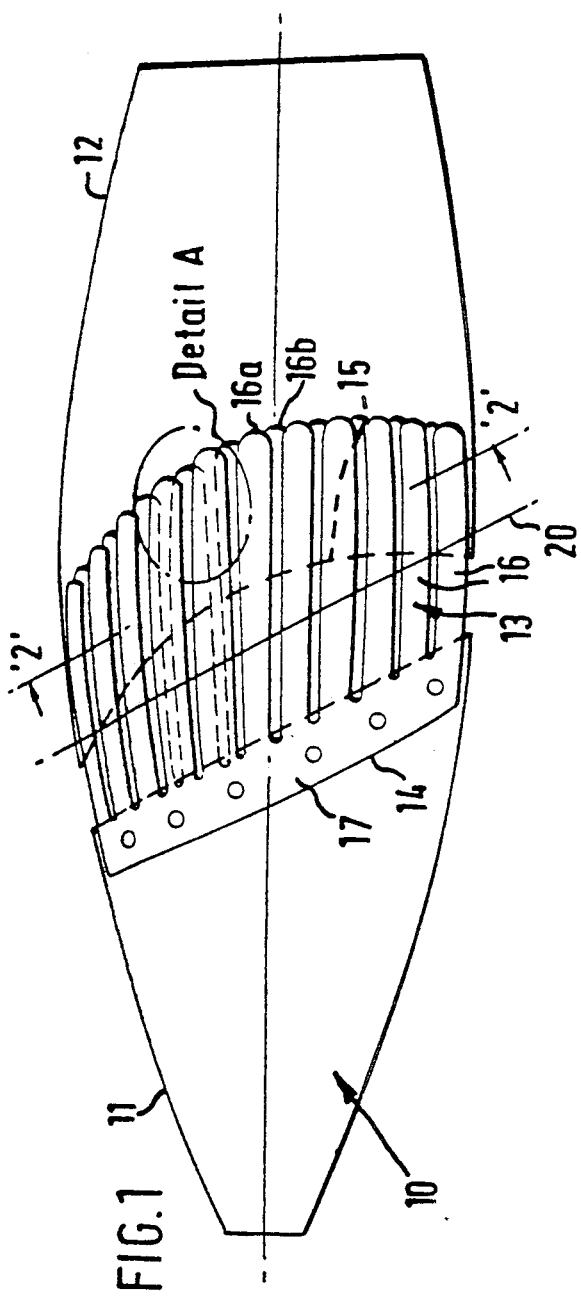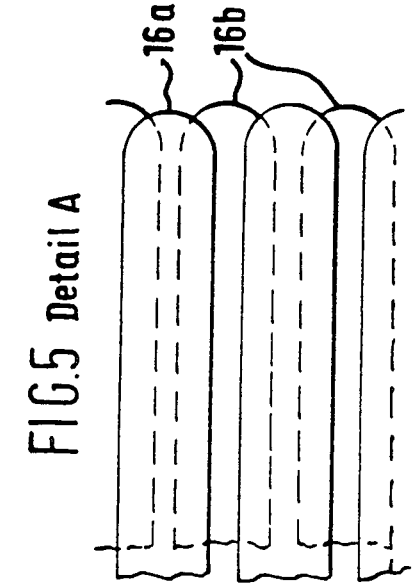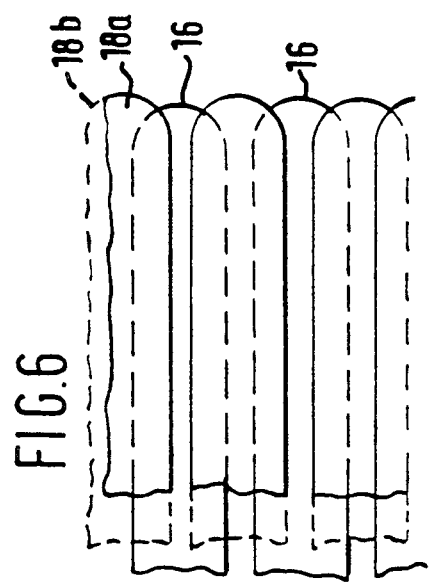

FAIRING ARRANGEMENTS FOR AIRCRAFT

This invention relates to fairing arrangements for aircraft. More particularly, though not exclusively, it relates to seal arrangements for use with externally mounted fairings associated with flying control surfaces, for example ailerons.

In our co-pending British Patent Application No. 8919057.3, we claim an externally mounted fairing arrangement in which the fairing portions respectively fixed to the aircraft fixed structure and the control surface are bridged by an intermediate flexible sealing portion comprising a labyrinth seal of two or more overlapping or interconnected sealing elements which can accommodate differential movement between the fixed fairing portions when the control surface is angularly displaced relative to the aircraft fixed structure, i.e. the wing.

An alternative sealing arrangement is disclosed in our copending British Patent Application No. 8921749.1, in which the intermediate flexible sealing portion comprises a single element sealing diaphragm which is deformable to accommodate the differential movement between the respective fairing portions. In the preferred arrangement, the diaphragm includes surface stabilising elements either stitched or moulded in situ. These stabilising elements can be single flexible rods, for example of circular cross-section, or of flat strips conveniently spaced across the diaphragm in a substantially longitudinal direction. In the case of the flat strips they can be individual items or they may comprise a number of metallic fingers projecting from a carrier.

According to the present invention, there is provided an externally mounted fairing arrangement for mounting upon and bridging an aircraft fixed structure and a control surface hingedly upon and angularly displaceable with respect to said aircraft structure, said fairing arrangement including a first fairing portion located upon said fixed aircraft structure, a second fairing portion located upon said control surface and an intermediate flexible seal arrangement interconnecting and bridging the gap between said first and second fairing portions, said flexible seal arrangement comprising two or more slidable overlapping layers of longitudinally extending fingers located to one of said fixed fairing portions and overlapping and slidably engaging the other fixed fairing portion, the seal arrangement being so configured that the fingers of at least one of said overlapping layers lie in laterally staggered relationship with respect to the fingers of its adjacent layer such that in combination their cross-section substantially conforms to the cross-section of said first and second fairing portions, but in operation can accommodate differential movement between said first and second fairing portions when said control surface is angularly displaced relative to said fixed structure.

Preferably, the fingers of at least one of said layers are of spring steel construction coated with suitable plastic low friction material and the fingers of the adjacent layer or layers is of plastic or nylon material.

Figure 3:
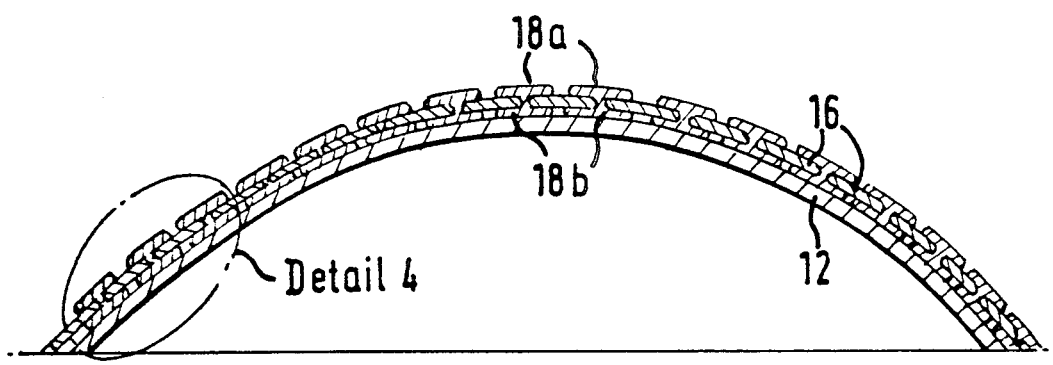
Figure 4:
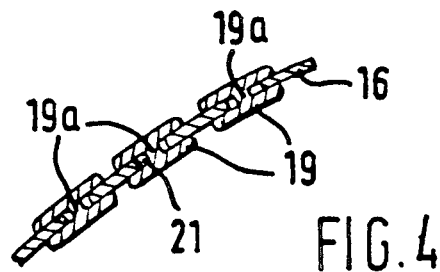

Preferred embodiments of the invention will now be described, by way of example only, and with reference to the following drawings, in which:

FIG. 1 illustrates a plan view on the fairing assembly arrangement in accordance with the invention, FIG. 2 is a cross-sectional view illustrating the sealing arrangement of the invention viewed along line '2-2' in FIG. 1, FIG. 3 is an alternative configuration of the same cross-section, FIG. 4 is an enlarged detail of the embodiment of FIG. 3 and indicated as 'Detail 4' thereon, FIG. 5 is detail 'A' of FIG. 1 on an enlarged scale, being a local plan view on the termination of the fingers in the embodiment of FIG. 2, and FIG. 6 is a local plan view on the termination of the fingers in the embodiment of FIG. 3.

Referring to the drawings, FIG. 1 illustrates a fairing assembly arrangement 10 comprising a forward fixed fairing portion 11 located to a fixed structure such as an aircraft wing (not shown), a second rear fixed fairing portion 12 located to a control surface structure, such as an aileron (not shown), and an interconnecting flexible sealing assembly 13 attached at 14 to the fairing portion 11 and extending rearwards to give a significant overlap 15 of the fairing portion 12. This overlap and the configuration of the flexible seal, in one embodiment, is shown in FIG. 2 in conjunction with FIGS. 1 and 5.

The flexible seal assembly comprises a double layer of longitudinally extending fingers 16 extending from a carrier 17 and includes an outer layer 16a of spring steel fingers coated with a plastic low friction material such as polytetrafluorethylene (PTFE) and an inner layer 16b of plastic or nylon fingers, arranged; such that the inner fingers are positioned in laterally staggered relationship with respect to the outer fingers but with the fingers of one layer overlapping those of the other layer, lengthwise, to ensure an uninterrupted sealing surface. At least the outer layer 16a being of spring steel is pre-loaded such as to maintain the assembly in cross-sectional conformity with the fixed fairing.

FIGS. 3, 4 and 6 show an alternative embodiment in which the spring steel fingers 16 are sandwiched between the outer and inner plastic or nylon fingers 18a and 18b respectively. Conveniently as shown in FIG. 4, these non-metallic fingers may be formed as integrally moulded fingers 19 having a dividing web 19a which effectively forms lengthwise grooves 21 for slidably engaging the spring steel fingers 16. The groove depth is adequate to allow lateral displacement of the fingers 16 when in use.

In operation, as the control surface to which the fairing portion 12 is attached is angularly displaced with respect to the fixed structure to which the fairing portion 11 is attached (i.e. it is displaced out of the plane of the paper as drawn about a hinge line 20), the flexible seal assembly by virtue of its multi-element construction and its inherent spring loading is maintained in sliding engagement and is able to accommodate differential movement between the relatively displaced fairing portions whilst still maintaining an effective seal and surface continuity.

In the annexed claims reference numbers have been used purely by way of example in order to facilitate comprehension, but it is hereby declared that absolutely no limitation of scope whatsoever is intended thereby.

We claim:

1. An externally mounted fairing arrangement for mounting on and bridging an aircraft fixed structure and a control surface hingedly mounted on and angularly displaceable with respect to said aircraft fixed structure, said fairing arrangement including a first fairing portion (11) located on said aircraft fixed structure, a second fairing portion (12) located on said control surface and an intermediate flexible seal arrangement (13) attached to one of said fairing portions and interconnecting and bridging the gap between said first and second fairing portions (11, 12), the improvement comprising at least two slidably overlapping layers of longitudinally extending fingers (16a, 16b; 16, 18a, 18b, 19, 19a) constituting said flexible seal arrangement (13), said layers overlapping and slidably engaging another of said fairing portions, the seal arrangement being so configured that the fingers of at least one of said overlapping layers lie in laterally staggered relationship with respect to the fingers of an adjacent layer such that in combination their cross-section substantially conforms to the cross-section of said first and second fairing portions but in operation can accommodate differential movement between said first and second fairing portions (11, 12) when said control surface is angularly displaced with respect to the said aircraft fixed structure.

2. An arrangement according to claim 1, wherein the fingers (16a) of at least one of said layers are of spring construction, and the fingers (16b) of the adjacent layer is a synthetic material.

3. An arrangement according to claim 1, wherein said the fingers (16) of one of said layers is of spring construction, said one layer being sandwiched between two other of said layers of fingers (18a, 18b).

4. An arrangement according to claim 3, wherein said one layer is metallic, and said two other layers are non-metallic.

5. An arrangement according to claim 3, wherein the fingers of said two other layers are integrally moulded fingers (19) having a dividing web (19a) forming longitudinal grooves (21) for slidably engaging the fingers (16) of said one layer.

6. An arrangement according to claim 4, wherein the fingers of said two other layers are integrally moulded fingers (19) having a dividing web (19a) forming longitudinal grooves for (21) for slidably engaging the fingers (16) of said one layer.

7. An arrangement according to claim 1, where the fingers (16a) of at least one of said layers are of spring construction and are coated with an anti-friction coating.

8. An arrangement according to claim 1 including at least three of said slidably overlapping layers of longitudinally extending fingers and wherein the fingers of a middle one of said overlapping layers lie in laterally staggered relationship with respect to the fingers of two adjacent layers.

* * * * *